(12) United States Patent
Okamoto et al.

(10) Patent No.: US 11,481,663 B2
(45) Date of Patent: Oct. 25, 2022

(54) INFORMATION EXTRACTION SUPPORT DEVICE, INFORMATION EXTRACTION SUPPORT METHOD AND COMPUTER PROGRAM PRODUCT

(71) Applicant: Kabushiki Kaisha Toshiba, Tokyo (JP)

(72) Inventors: Masayuki Okamoto, Kawasaki Kanagawa (JP); Yuichi Miyamura, Yokohama Kanagawa (JP); Hirokazu Suzuki, Machida Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 746 days.

(21) Appl. No.: 15/689,975

(22) Filed: Aug. 29, 2017

(65) Prior Publication Data
US 2018/0137435 A1 May 17, 2018

(30) Foreign Application Priority Data
Nov. 17, 2016 (JP) .............................. JP2016-224305

(51) Int. Cl.
*G06N 20/00* (2019.01)
(52) U.S. Cl.
CPC .................... *G06N 20/00* (2019.01)
(58) Field of Classification Search
CPC ...................................................... G06N 20/00
See application file for complete search history.

(56) References Cited

U.S. PATENT DOCUMENTS

| 4,912,063 | A | 3/1990 | Davis et al. |
| 8,316,001 | B1 | 11/2012 | Albrecht et al. |
| 8,566,360 | B2 | 10/2013 | Chen |
| 8,645,391 | B1 | 2/2014 | Wong et al. |

(Continued)

FOREIGN PATENT DOCUMENTS

| JP | H 06-243132 A | 9/1994 |
| JP | H 07-334574 A | 12/1995 |

(Continued)

OTHER PUBLICATIONS

U.S. Appl. No. 15/420,834, filed Jan. 31, 2017, Nakata.

(Continued)

*Primary Examiner* — Brent Johnston Hoover
(74) *Attorney, Agent, or Firm* — Knobbe, Martens, Olson & Bear, LLP

(57) ABSTRACT

An information extraction support device includes a receptor, a pattern generator, a data generator, and an output controller. The receptor receives input of a first training example for learning a model used in at least one of extraction of information and extraction of a relation between a plurality of pieces of information, and clue information indicating a basis on which the first training example is used for learning. The pattern generator generates a supervised pattern for generating a training example used for learning, using the first training example and the clue information. The data generator generates a second training example using the supervised pattern. The output controller outputs the second training example and the clue information that is used to generate the supervised pattern having generated the second training example.

12 Claims, 14 Drawing Sheets

(56) References Cited

U.S. PATENT DOCUMENTS

| | | |
|---|---|---|
| 9,898,464 B2 | 2/2018 | Okamoto et al. |
| 2002/0002567 A1 | 1/2002 | Kanie et al. |
| 2003/0004902 A1 | 1/2003 | Yamanishi et al. |
| 2005/0144177 A1 | 6/2005 | Hodes |
| 2005/0160086 A1 | 7/2005 | Haraguchi et al. |
| 2005/0251738 A1 | 11/2005 | Hirano et al. |
| 2005/0261889 A1* | 11/2005 | Iwakura ............... G06F 40/295 704/4 |
| 2006/0112040 A1 | 5/2006 | Oda |
| 2006/0242130 A1* | 10/2006 | Sadri ................... G06F 16/951 |
| 2006/0282442 A1 | 12/2006 | Lennon et al. |
| 2007/0005344 A1 | 1/2007 | Sandor et al. |
| 2007/0073653 A1 | 3/2007 | Raab |
| 2009/0077122 A1 | 3/2009 | Fume et al. |
| 2009/0112642 A1 | 4/2009 | Uekane et al. |
| 2009/0265160 A1 | 10/2009 | Williams et al. |
| 2010/0063948 A1* | 3/2010 | Virkar .................. G06N 20/00 706/12 |
| 2010/0076991 A1 | 3/2010 | Nakano et al. |
| 2010/0114561 A1 | 5/2010 | Yasin |
| 2010/0145678 A1 | 6/2010 | Csomai et al. |
| 2011/0078098 A1 | 3/2011 | Lapir et al. |
| 2011/0264691 A1 | 10/2011 | Migita |
| 2012/0030157 A1 | 2/2012 | Tsuchida et al. |
| 2012/0197826 A1* | 8/2012 | Mineno ................ G06N 20/00 706/12 |
| 2012/0304008 A1* | 11/2012 | Hackstein .......... G05B 23/0229 714/26 |
| 2013/0013291 A1 | 1/2013 | Bullock et al. |
| 2013/0029478 A1 | 1/2013 | Zhang et al. |
| 2013/0066912 A1 | 3/2013 | Chetuparambil et al. |
| 2013/0076751 A1 | 3/2013 | Jung et al. |
| 2013/0086094 A1 | 4/2013 | Lundberg |
| 2013/0173257 A1 | 7/2013 | Rose et al. |
| 2013/0179381 A1 | 7/2013 | Kawabata et al. |
| 2013/0246048 A1 | 9/2013 | Nagase et al. |
| 2014/0032513 A1 | 1/2014 | Gaither |
| 2014/0372257 A1 | 12/2014 | Nishioka |
| 2015/0058309 A1 | 2/2015 | Cho et al. |
| 2016/0055196 A1 | 2/2016 | Collins et al. |
| 2016/0140389 A1 | 5/2016 | Okamoto et al. |
| 2016/0155058 A1* | 6/2016 | Oh ........................ G06N 5/041 706/11 |
| 2017/0075877 A1 | 3/2017 | Lepeltier |
| 2017/0091289 A1 | 3/2017 | Ohazulike et al. |
| 2017/0124067 A1 | 5/2017 | Okamoto et al. |
| 2017/0139774 A1 | 5/2017 | Miyamura et al. |
| 2017/0227951 A1 | 8/2017 | Orihara et al. |
| 2021/0286948 A1* | 9/2021 | Kruengkrai .......... G06N 3/0454 |

FOREIGN PATENT DOCUMENTS

| | | |
|---|---|---|
| JP | H 09-325962 A | 12/1997 |
| JP | H 11-167576 A | 6/1999 |
| JP | 2001-134600 A | 5/2001 |
| JP | 2002-024211 A | 1/2002 |
| JP | 2002-056354 A | 2/2002 |
| JP | 2003-044481 A | 2/2003 |
| JP | 2003-167870 A | 6/2003 |
| JP | 2004-126903 A | 4/2004 |
| JP | 2005-100082 A | 4/2005 |
| JP | 2005-190338 A | 7/2005 |
| JP | 2006-065387 A | 3/2006 |
| JP | 2010-205218 A | 9/2010 |
| JP | 2010-218209 A | 9/2010 |
| JP | 4565106 B2 | 10/2010 |
| JP | 2011-108085 A | 6/2011 |
| JP | 2013-073619 A | 4/2013 |
| JP | 2013-105321 A | 5/2013 |
| JP | 2013-143039 A | 7/2013 |
| JP | 2013-196374 A | 9/2013 |
| JP | 5341276 B1 | 11/2013 |
| JP | 5356197 B2 | 12/2013 |
| JP | 2014-106611 A | 6/2014 |
| JP | 2014-137722 A | 7/2014 |
| JP | 2016-099741 A | 5/2016 |
| JP | 2017-091000 A | 5/2017 |
| WO | WO 2010/119615 A1 | 10/2010 |
| WO | WO 2014/081012 A1 | 5/2014 |

OTHER PUBLICATIONS

Ciravegna, F., "Adaptive Information Extraction from Text by Rule Induction and Generalisation", Proceedings of IJACI-2001.

Milkov Thomas, et al. "Efficient Estimation of Word Representations in Vector Space", arXiv:1301.3781, Sep. 2013.

* cited by examiner

| REGISTERED EXAMPLE | WEAK SUPERVISED PATTERN INDICATING ATTRIBUTE | OUTPUT EXAMPLE FROM SYSTEM AND DETERMINATION BY HUMAN | |
|---|---|---|---|
| (a1) 100 | (b1)→100 | | |
| (a2) 200 | (b2)→200 | | |
| (a3) 1.5 | (b3)→1.5 | | |
| (a4) $1.2 \times 10^2$ | (b4)→$1.2 \times 10^2$ | | |
| (a5) $2.3 \times 10^3$ | (b5)→$2.3 \times 10^3$ | | |
| GENERALIZATION FROM REGISTERED EXAMPLES | (a1)+(a2)→(b6) INTEGRAL NUMBER | 50 | ○ |
| | (a1) TO (a3)→(b7) VALUE | 9.7 | ○ |
| | (a4)+(a5) →(b8) VALUE+WORD+ INTEGRAL NUMBER ... | $-0.5 \times 10^4$ ○<br>-[mobility for condition] 1 was 100 [cm$^2$/Vs] | × |

FIG.9

WEAK SUPERVISED PATTERN APPLICATION RESULT

| DocID | MATERIAL | MOBILITY | BASIS | CHANGE | AUTO-MATIC | MANUAL |
|---|---|---|---|---|---|---|
| XXX1<br>XXX1 | GaN<br>SiGe | 100<br>200 | DISPLAY | | POSITIVE EXAMPLE<br>POSITIVE EXAMPLE | POSITIVE EXAMPLE<br>POSITIVE EXAMPLE |
| XXX2 | AlGaN | 1.5 | DISPLAY | | POSITIVE EXAMPLE | DETERMINE |
| XXX3 | InGaAs | $1.2 \times 10^2$ | DISPLAY | | POSITIVE EXAMPLE | DETERMINE |
| XXX4 | GaAs | $2.3 \times 10^3$ | DISPLAY | | POSITIVE EXAMPLE | DETERMINE |
| XXY5 | AlGaN | 50 | DISPLAY | NEW | POSITIVE EXAMPLE | DETERMINE |
| XXZ3 | InGaZnO | 300 | DISPLAY | CHANGED | NEGATIVE EXAMPLE | DETERMINE |
| XXZ3 | InGaZnO | 9.7 | DISPLAY | NEW | POSITIVE EXAMPLE | DETERMINE |

FIG.10

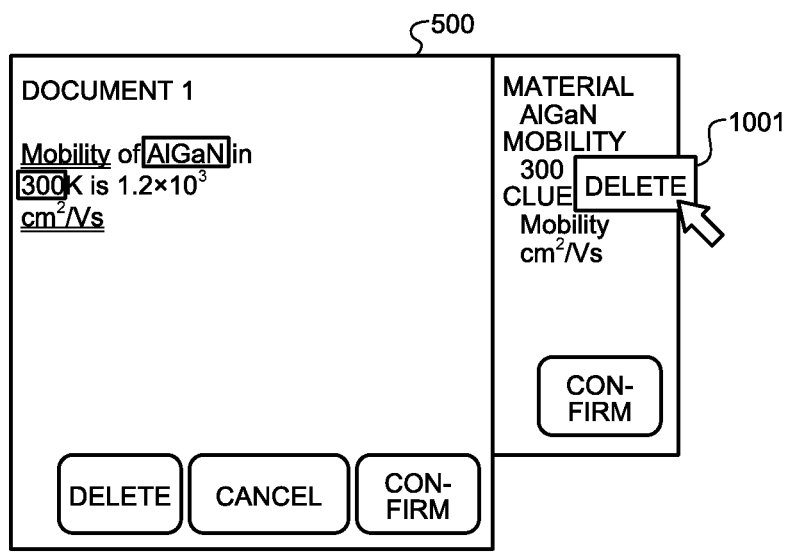

| MOBILITY | DETER-MINATION | |
|---|---|---|
| 100 | ○ | × |
| 1.5 | ○ | × |
| $1.2×10^2$ | ○ | × |
| 50 | ○ | × |
| abc | ○ | × |
| 9.7 | ○ | × |
| 1 was 100 | ○ | × |

FIG.13

| MOBILITY | DETER-MINATION | |
|---|---|---|
| 50<br>100<br>200 | ○ | × |
| 1.5<br>9.7 | ○ | × |
| 1 was 100 | ○ | × |

FIG.14

| MOBILITY | DETER-MINATION | |
|---|---|---|
| 1<br>10000 | ○ | × |
| 1.025<br>139.7 | ○ | × |
| 50 then 3 | ○ | × |

FIG.15

| SENTENCE ID | MATERIAL | MOBILITY | EVALUATION |
|---|---|---|---|
| XXX1 | GaN | 300 | MANUAL INPUT |
| XXY5 | GaN | 250 | UN-EVALUATED |

☐ PARTIALLY-DIFFERENT RESULT IS NOT ALLOWED
(1501)
(1500)

FIG.16

| SENTENCE ID | PERSON'S NAME 1 | PERSON'S NAME 2 | EVALUATION STATE |
|---|---|---|---|
| AXX1 | BARACK OBAMA | MICHELLE OBAMA | MANUAL INPUT |
| AXY5 | BARACK OBAMA | HILLARY CLINTON | CONTRA-DICTION |

☑ PARTIALLY-DIFFERENT RESULT IS NOT ALLOWED
(1601)
(1600)

FIG.19

| SENTENCE ID | COMPANY 1 | COMPANY 2 | CHANGE |
|---|---|---|---|
| BXX1 | COMPANY A | COMPANY C | COMBINATION CHANGED |

(PREVIOUS TIME)
Against company A, company B and company C established a joint venture (THIS TIME)
Against company A, company B and company C established a joint venture 1901
1902

FIG.20

TABULATION RESULT OF WEAK SUPERVISED PATTERNS

| | |
|---|---|
| NUMBER OF WEAK SUPERVISED PATTERNS | 100 |
| NUMBER OF CLUE EXPRESSIONS | 130 |
| EXAMPLE CANDIDATE (POSITIVE EXAMPLE) | 1,050 |
| CANDIDATE IS CORRECT | 70 |
| CANDIDATE IS INCORRECT | 10 |
| EXAMPLE CANDIDATE (NEGATIVE EXAMPLE) | 10,249 |
| CANDIDATE IS CORRECT | 200 |
| CANDIDATE IS INCORRECT | 5 |

With many negative examples, it is proposed to increase examples as positive examples

FIG.21

KNOWLEDGE BASE (2100)

| DocID | MOBILITY | BASIS | CHANGE | AUTO-MATIC | MANUAL | LEARNING SCORE |
|---|---|---|---|---|---|---|
| XXX1<br>XXX1 | 100<br>200 | DIS-PLAY | | POSITIVE EXAMPLE<br>POSITIVE EXAMPLE | POSITIVE EXAMPLE<br>POSITIVE EXAMPLE | 0.95<br>0.98 |
| XXX2 | 1.5 | DIS-PLAY | | POSITIVE EXAMPLE | POSITIVE EXAMPLE | 0.96 |
| XXX3 | $1.2 \times 10^2$ | DIS-PLAY | | POSITIVE EXAMPLE | POSITIVE EXAMPLE | 0.95 |
| XXX4 | $2.3 \times 10^3$ | DIS-PLAY | | POSITIVE EXAMPLE | POSITIVE EXAMPLE | 0.92 |
| XXY5 | 50 | DIS-PLAY | | POSITIVE EXAMPLE | POSITIVE EXAMPLE | 0.89 |
| XXZ3 | 9.7 | DIS-PLAY | | POSITIVE EXAMPLE | POSITIVE EXAMPLE | 0.96 |
| XXW0 | 1 was 100 | DIS-PLAY | | POSITIVE EXAMPLE | NEGATIVE EXAMPLE | 0.03 |
| YYA0 | $5.9 \times 10^3$ | DIS-PLAY | INFER-ENCE RESULT | POSITIVE EXAMPLE | DETER-MINE | 0.96 |
| YYA1 | 24 | DIS-PLAY | INFER-ENCE RESULT | POSITIVE EXAMPLE | DETER-MINE | 0.15 |
| ... | ... | ... | ... | ... | ... | ... |

US 11,481,663 B2

INFORMATION EXTRACTION SUPPORT DEVICE, INFORMATION EXTRACTION SUPPORT METHOD AND COMPUTER PROGRAM PRODUCT

CROSS-REFERENCE TO RELATED APPLICATIONS

This application is based upon and claims the benefit of priority from Japanese Patent Application No. 2016-224305, filed on Nov. 17, 2016; the entire contents of which are incorporated herein by reference.

FIELD

Embodiments described herein relate generally to an information extraction support device, an information extraction support method, and a computer program.

BACKGROUND

An information extraction system has been developed that extracts, from a document, an attribute such as a merchandise name and a merchandise price and the relation between attributes such as the relation between a merchandise name and a merchandise price. With the use of such a system, specific information in the document can be organized easily (for example, a merchandise specification list is extracted from a document and gathered in a table). Such information extraction processing is often achieved using a machine learning technique. In this case, one-time learning does not necessarily complete the information extraction processing, and it is necessary to improve clues (characteristics) useful for learning and a way of providing positive examples and negative examples required for learning while evaluating the processing.

However, in the conventional technique, it is necessary to prepare a large amount of positive examples and negative examples as training examples for machine learning, which requires great efforts for work of preliminarily labeling training examples.

BRIEF DESCRIPTION OF THE DRAWINGS

FIG. 9 is a diagram illustrating an example of an output result;

FIG. 10 is a diagram illustrating an example of a screen to correct an error of an output result;

FIG. 13 is a diagram illustrating an example of a determination screen to perform determination only with a value of an example candidate;

FIG. 14 is a diagram illustrating an example of a determination screen to perform determination only with a value of an example candidate;

FIG. 15 is a diagram illustrating an output example of an output result in the case where a partially different example candidate is generated;

FIG. 16 is a diagram illustrating an output example of an output result in the case where a partially different example candidate is generated;

FIG. 19 is a diagram illustrating an example of an example candidate in the case where the combination of the relation is changed;

FIG. 20 is a diagram illustrating a display example of determination information;

FIG. 21 is a diagram illustrating an example of a screen displaying learning scores as well.

DETAILED DESCRIPTION

Figure 1:
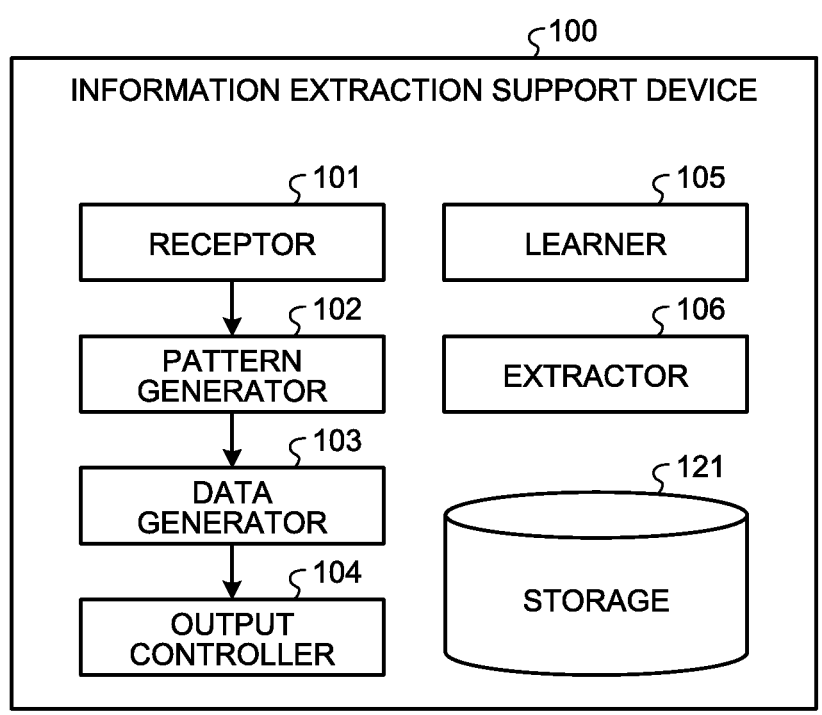
FIG. 1 is a block diagram of an information extraction support device according to an embodiment.

According to one embodiment, an information extraction support device includes a receptor, a pattern generator, a data generator, and an output controller. The receptor receives input of a first training example for learning a model used in at least one of extraction of information and extraction of a relation between a plurality of pieces of information, and clue information indicating a basis on which the first training example is used for learning. The pattern generator generates a supervised pattern for generating a training example used for learning, using the first training example and the clue information. The data generator generates a second training example using the supervised pattern. The output controller outputs the second training example and the clue information that is used to generate the supervised pattern having generated the second training example.

Preferred embodiments of the information extraction support device according to the invention will be described in detail with reference to the enclosed drawings.

As described above, the conventional supervised learning requires preparation of a large amount of training examples for machine learning, which increases a work load. The embodiment reduces the number of training examples taught by an operator himself/herself, obtains a teaching rule (supervised pattern) based on taught training examples, and applies it to other data. This reduces the cost for teaching by an operator. That is, in the embodiment, training examples are generated based on a teaching system (weak supervision) based on a "generally correct" labeling method, without individually labeling training examples as performed conventionally. This reduces the efforts for labeling work.

When the system of obtaining a teaching pattern of a weak supervision (hereinafter, referred to as a week supervised pattern) is used, it is difficult to determine, based on input training examples alone, what kind of knowledge and clue are used as bases by the operator to register the training examples. Then, it is desirable to improve learning effects from training examples by means of inputting clues as bases to determine that the training examples are positive examples or negative examples. Furthermore, the operator cannot necessarily grasp a generated weak supervised pattern easily, and thus it is desirable that the operator himself/herself can generate and update a weak supervised pattern without describing or understanding it by himself/herself.

Thus, in the embodiment, labeling is performed based on the weak supervision rule labeling an attribute or the relation between attributes, in which the weak supervision rule is generated based on training examples of an attribute or the relation between attributes and clues for determining whether an attribute or the relation between attributes is appropriate. Moreover, the embodiment presents, together with training examples and clues both serving as bases, a difference from existent training examples and labeling results. In this manner, it is possible to label a weak supervision with high accuracy while reducing work efforts.

FIG. 1 is a block diagram illustrating an example of a configuration of an information extraction support device 100 according to the embodiment. As illustrated in FIG. 1, the information extraction support device 100 includes a receptor 101, a pattern generator 102, a data generator 103, an output controller 104, a learner 105, an extractor 106, and a storage 121.

The receptor 101 receives input of various kinds of information used in various kinds of processing by the information extraction support device 100. For example, the receptor 101 receives input of one or more pieces of object data to be analyzed, one or more training examples (first training examples) of the object data, and clue expressions.

The following will describe the case in which electronic documents are mainly object data (object documents). However, other kind of data such as images and sounds may be object data. The receptor 101 may obtain an object document input by the operator or collect an object document through an external server or the like. The object document is text data expressed in natural sentences such as news articles, papers, and patent specifications, which are uploaded onto web pages and the Internet, for example. The object document is not limited thereto, and may be any kind of document as long as an attribute can be extracted from data. The attribute indicates the kind of desired information to be extracted by the operator, and includes a merchandise name, a price, a company name, a material name, and a characteristic value, for example. The relation between a plurality of attributes may be further regarded as an attribute.

The training example is information of a concrete example to be extracted, which indicates which word or word string is to be extracted from an object document, for example. Moreover, the training example is used to learn a model used for information extraction processing. For example, the training example indicates information such as "the word 'XX' appearing in the N-th sentence of the document D is a merchandise name". An example of a concrete method of inputting a training example will be described later.

The clue expression is information (clue information) served as a basis for determining why the above-described training example is a desired attribute or relation. The clue expression can be referred to, in other words, as information indicating the basis on which the training example is used for learning, or information indicating the basis on which the training example is an object to be taught. For example, the clue expression indicates information such as "in the character string 'new merchandise name XX' appearing in the N-th sentence of the document D, the character string 'new merchandise' is a clue expression for determining that the character string 'XX' is a merchandise name". An example of a concrete method of inputting a clue expression will be described later.

The receptor 101 further receives input of a determination result indicating whether the training example generated by the later described data generator 103 is correct.

The pattern generator 102 generates a supervised pattern using the received training example (first training example) and clue information. The supervised pattern is a pattern for generating a training example used in learning of a model used for information extraction processing. For example, the pattern generator 102 generates, based on an object document, a training example, and a clue expression, a weak supervised pattern that can output a training example candidate with the attribute (individual attribute or relation between attributes) the same as that of the training example. The weak supervised pattern indicates a pattern matching rule such as "the word 'XX' is regarded as a merchandise name" and "an integral number appearing immediately before the word 'yen' is regarded as a price", for example. The supervised pattern can be referred to, in other words, as information defining a condition satisfied by a training example used for learning. The supervised pattern may be a pattern generating training examples as positive examples, or a pattern generating training examples as negative examples.

The pattern generator 102 updates the supervised pattern based on a determination result input regarding the training example generated by the supervised pattern. The generation processing and update processing of the supervised pattern will be described later in detail.

The data generator 103 generates a training example (second training example) by the supervised pattern generated by the pattern generator 102. Moreover, the data generator 103 generates a training example (third training example) by the supervised pattern updated by the pattern generator 102. For example, the data generator 103 applies a weak supervised pattern generated by the pattern generator 102 to a document to generate new training examples (training example candidates), and labels each candidate of the generated training examples as a positive example or a negative example. In the following, a training example candidate including an attribute and a labeling result obtained by means other than teaching by the operator such as a weak supervised pattern will be referred to as an example candidate. Note that the document to which the weak supervised pattern is applied may be different from a document to which the operator adds a training example (object document).

The output controller 104 controls output of various kinds of information used in various kinds of processing by the information extraction support device 100. For example, the output controller 104 controls output (display) of information to a display device (display, etc.). The display device may be provided either inside or outside the information extraction support device 100. The information output method is not limited to a method of display in a display device.

For example, the output controller 104 associates an example candidate generated by the data generator 103 with a clue expression used for generation of a supervised pattern having generated the example candidate, and outputs the associated result to a display device or the like. In this manner, the operator can determine whether the example candidate is correct more appropriately.

The output controller 104 may output a difference between the example candidate generated before and a newly generated example candidate. For example, when the pattern generator 102 has updated a supervised pattern, the output controller 104 may output information indicating a difference of the example candidate generated by the updated supervised pattern from the example candidate generated by the supervised pattern before update. The information indicating a difference is, for example, information indicating that the example candidate has been newly generated, information indicating that the label of the corresponding example candidate has been changed, and the like.

The learning part 105 learns a model used for information extraction processing using training examples. The model used for information extraction processing may be any desired model. For example, it is possible to apply a model learned by supervised learning. The supervised learning is a construction system of a model estimating output with respect to unknown input based on preliminarily provided training examples (input data as an exercise and the combination of output of correct answers to input data as an exercise). The typical method includes the logistic regression, the neutral network, the support vector machine (SVM), the decision tree, the conditional random field (CRF), and the markov logic network (MLN), and the combination thereof, for example.

As the machine learning system, any desired existent method may be used. As the supervised data input method, any of the following methods may be used: a method of inputting an example candidate itself; a method of generating supervised data by applying a weak supervised pattern; and the combination thereof. Moreover, when a clue expression can be newly added to the machine learning system, the method may be used that registers, as a characteristic for learning, the presence or absence of a clue expression registered in the embodiment.

The extraction of the relation includes two phases of extraction of a plurality of attributes and extraction of the relation between the attributes. In the embodiment, the weak supervised pattern and the example candidate are output with respect to both the attribute and the relation between attributes. Thus, it is possible to use output information without newly forming each of extraction processing for learning.

The extractor 106 extracts information from a document using a learned model. For example, the extractor 106 applies a model to a specified document, and extracts individual attributes and the relation between the attributes. The output controller 104 may further output an extraction result by the extractor 106 to a display device or the like.

The storage 121 stores various kinds of information used in various kinds of processing by the information extraction support device 100. For example, the storage 121 stores results obtained by the output controller 104. The storage 121 may be formed by any storage medium used generally such as a hard disk drive (HDD), an optical disk, a memory card, and a random access memory (RAM).

Note that the receptor 101, the pattern generator 102, the data generator 103, the output controller 104, the learner 105, and the extractor 106 may be achieved by causing one or more processing circuits such as a central processing unit (CPU) to execute a computer program, that is, by software, or achieved by hardware such as one or more integrated circuits (IC). Alternatively, they may be achieved by the combination of software and hardware.

Figure 2:
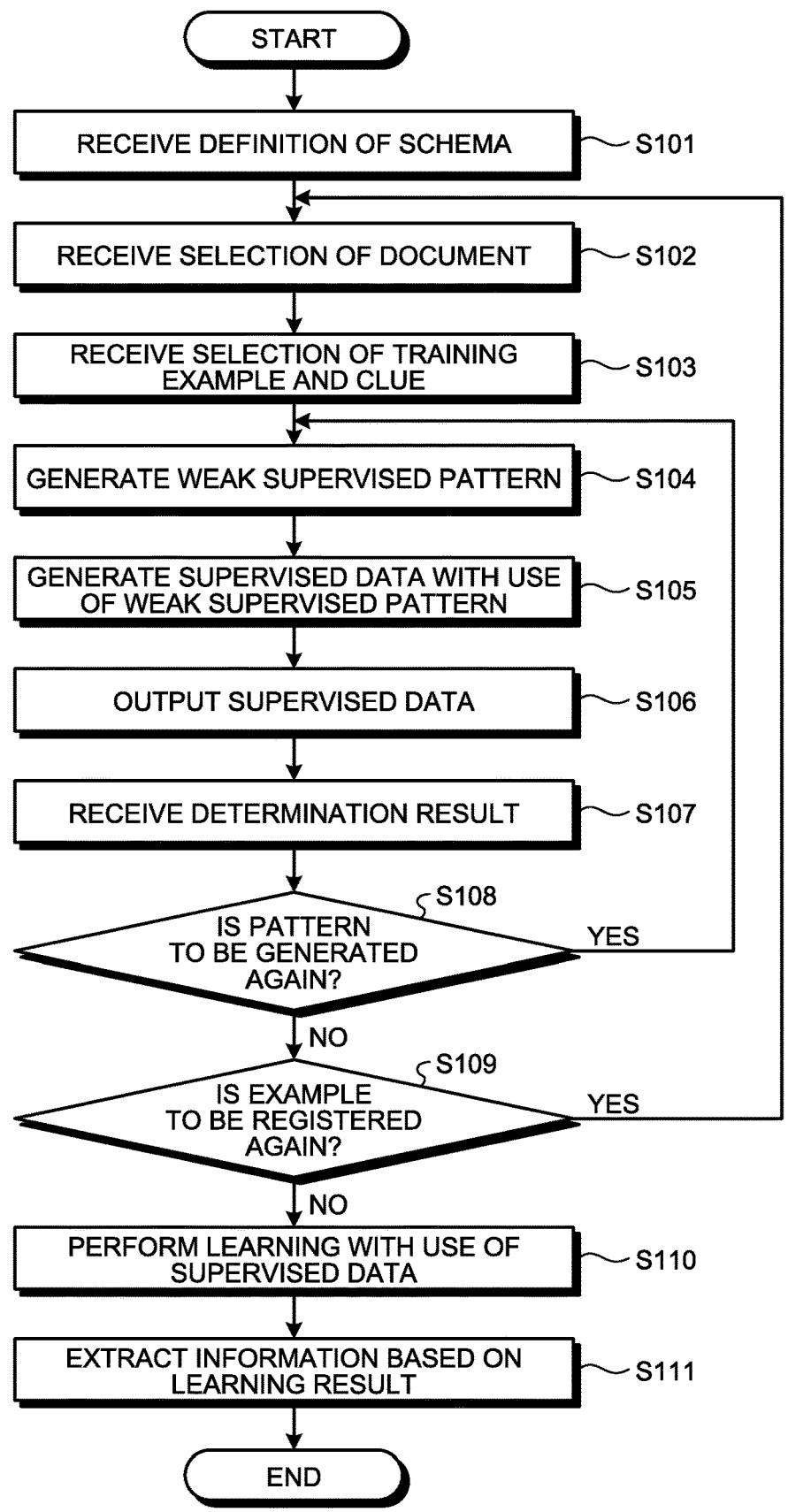
FIG. 2 is a flowchart illustrating an example of information extraction support processing according to the embodiment.

The following will describe information extraction support processing by the information extraction support device 100 of the embodiment arranged in the above-described manner with reference to FIG. 2. FIG. 2 is a flowchart illustrating an example of information extraction support processing according to the embodiment;

First, the operator defines a schema (format) indicating what kind of attribute or relation between attributes is extracted. The receptor 101 receives the specified definition of the schema (Step S101). For example, when the relation between the attribute "merchandise name" and the attribute "price" is extracted, two attribute names and data format such as "a value of the attribute 'price' is an integral number" are defined as the schema.

Figure 3:
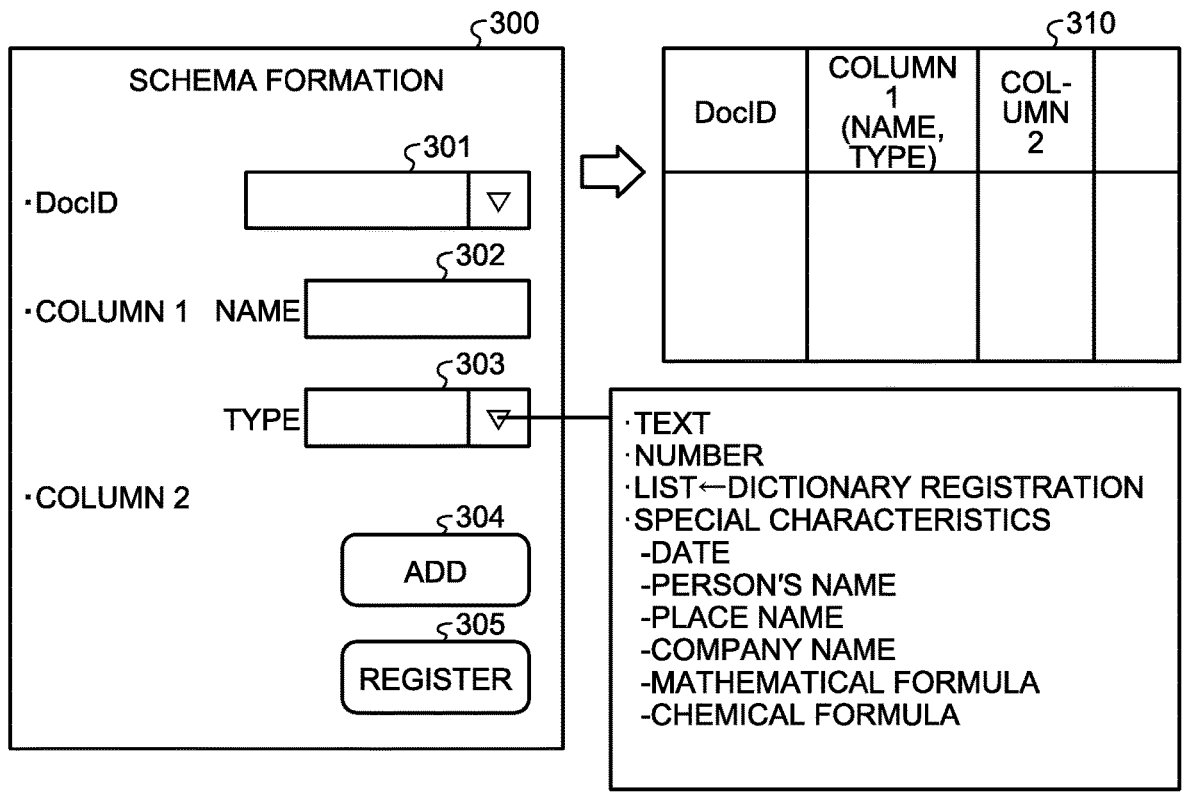
FIG. 3 is a diagram illustrating an example of a schema formation screen to form a schema.

FIG. 3 is a diagram illustrating an example of a schema formation screen to form a schema. As illustrated in FIG. 3, a schema formation screen 300 includes input fields 301, 302, 303, an addition button 304, and a registration button 305. The input field 301 is a field to which identification information of a document (Doc ID) is input. The input field 302 is a field to which an attribute name is input. The input field 303 is a field to which an attribute type is input. When the addition button 304 is pressed, a field for adding a new column (attribute) is added onto the screen. When the registration button 305 is pressed, the input schema is registered in a database or the like. A table 310 illustrates an example of the registered schema. The expression format of the schema is not limited to a table format.

Returning to FIG. 2, the receptor 101 receives selection of a document or a part of a document to be processed (Step S102). The receptor 101 receives a document selected by the operator among documents displayed in a list, for example. The processing of searching a desired document by document search or the like may be included before selecting a document.

Figure 4:
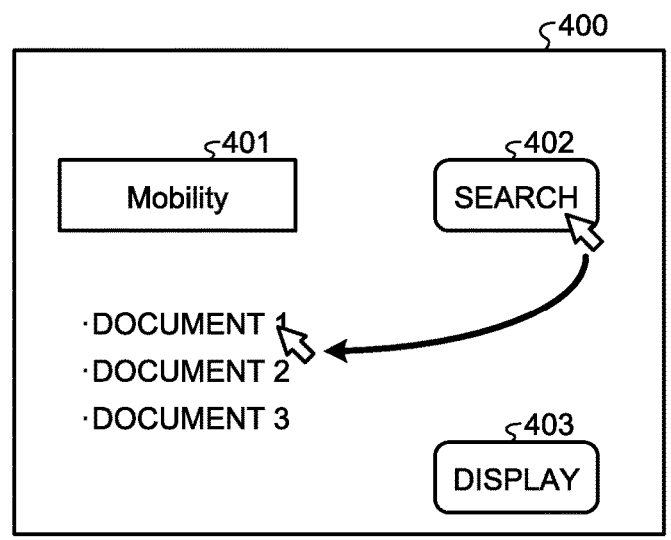
FIG. 4 is a diagram illustrating an example of a document search screen to search an object document.

FIG. 4 is a diagram illustrating an example of a document search screen to search an object document. FIG. 4 is an example of a document search screen when an object document is searched by a keyword search. As illustrated in FIG. 4, a document search screen 400 includes an input field 401, a search button 402, and a display button 403. The input field 401 is a field to which a search keyword is input. When the search button 402 is pressed, documents are searched with a character string input in the input field 401 as a search keyword. The object document is searched with the Internet, a given server, and the like, for example, as the search object. Once the display button 403 is pressed after any of the searched documents is selected, the selected document is displayed. The operator can further select training examples and the like in the displayed document.

Returning to FIG. 2, the receptor 101 receives selection of training examples and clue expressions by the operator in the selected document or a part of the selected document (Step S103). The pattern generator 102 generates a weak supervised pattern based on the received training examples (attribute, relation between attributes, etc.) and clue expressions (Step S104). The data generator 103 applies the generated weak supervised pattern to the document to generate a new piece of supervised data (example candidate) (Step S105).

The output controller 104 outputs the generated example candidate (attribute, label, etc.) (Step S106). With the second or subsequent generation of an example candidate, the output controller 104 may compare the example candidate generated in the previous time with the example candidate generated this time, and output information indicating a difference between both.

The operator confirms example candidates displayed in the display device, for example, and inputs determination results of whether each example candidate is correct. The receptor 101 receives determination results input in this manner (Step S107). The pattern generator 102 further determines whether a supervised pattern is to be generated again (Step S108). For example, when an example candidate with error input exists, the pattern generator 102 regards the example candidate corrected in accordance with the determination result as a new training example, and generates a weak supervised pattern again. For example, when the determination result indicating that the example candidate generated as a positive example is incorrect is input, the pattern generator 102 corrects the example candidate to be a negative example, and generates a weak supervised pattern again. The determination method of whether a supervised pattern is to be generated again is not limited thereto. For example, a supervised pattern may be generated again when the operator specifies the re-generation. The pattern generator 102 may delete an example candidate with error input and generate a weak supervised pattern again.

When it is determined that a supervised pattern is to be generated again (Yes at Step S108), the processing returns to Step S104 to repeat processing. When it is not determined that a supervised pattern is to be generated again (No at Step S108), the receptor 101 determines whether the training example is to be registered again (Step S109).

For example, the receptor 101 determines that the training example is to be registered again when the operator specifies re-registration of the training example. The operator confirms whether the accuracy of the displayed training example (example candidate) is sufficient, for example, and specifies re-registration of the training example when the accuracy is not sufficient.

When the training example is to be registered again (Yes at Step S109), the processing returns to Step S102 to repeat processing. When the training example is not to be registered again (No at Step S109), the learner 105 performs learning using the generated training example (supervised data) (Step S110). The extractor 106 extracts attributes from the specified document using a learned model (Step S111). The output controller 104 may output the extracted attributes to a display device or the like.

In general, learning of a model requires time. Thus, rapid generation of a large amount of supervised data with high accuracy before learning contributes to the efficiency and improvement of performance of learning and information extraction. In the embodiment, it is possible to support work of the operator by processing of Step S102 to Step S109 and generate a large amount of supervised data with high accuracy.

The following will further describe concrete examples of each of the above-described processing using screen examples and the like.

Figure 5:
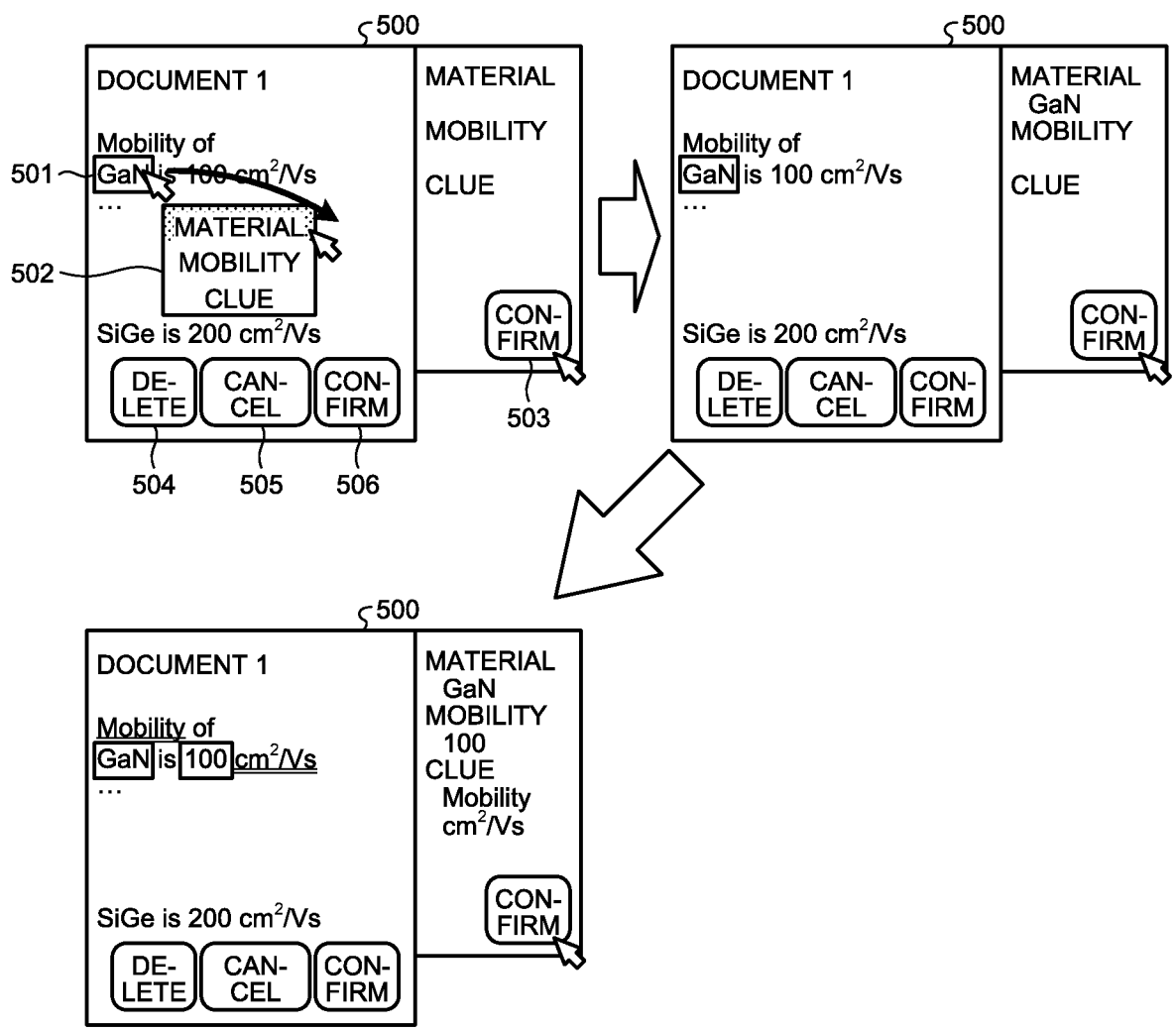
FIG. 5 is a diagram illustrating an example of a method of registering training examples and clue expressions.

FIG. 5 is a diagram illustrating an example of a method of registering training examples and clue expressions. FIG. 5 illustrates an example of an example registration screen 500 for the operator to register (select) training examples and the like at Step S103. Once a desired character string 501 in a document displayed in the example registration screen 500 is selected, a field 502 for selecting an attribute and the like of the character string 501 is displayed. On the field 502, it is possible to select an attribute such as the "material" and the "mobility" or the "clue" for specifying as a clue expression. For example, the attributes included in the schema formed in the schema formation screen described in FIG. 3 are displayed to be selectable on the field 502.

Once a confirmation button 503 is pressed, the specification of an attribute and the like with respect to the currently selected character string is confirmed. Once a delete button 504 is pressed, a selected attribute of the selected character string, for example, is deleted. Once a cancel button 505 is pressed, processing is cancelled, so that the screen returns to the previous screen, for example. Once a confirmation button 506 is pressed, the training examples registered (selected) so far are confirmed and stored in the storage 121 or the like.

In this manner, the operator selects the character string 501, and selects the "material" as an attribute of the character string 501. As long as the character string can be associated with the attribute, other input systems may be used.

The example registration screen 500 in the upper right of FIG. 5 shows the state in which the operator has registered the character string "GaN" as a material name. Similarly, the example registration screen 500 in the lower left of FIG. 5 shows the state in which the operator has registered a value of the attribute "mobility" corresponding to the material name "GaN" is "100" and the character strings as bases for determining that such attributes are training examples are "mobility" and "cm$^2$/Vs".

The clue expression may be selected or input by the operator himself/herself, as illustrated in FIG. 5. When the keyword ("mobility") for searching the document is input, as illustrated in FIG. 4, the keyword may be registered as a clue expression.

Figures 6, 7:
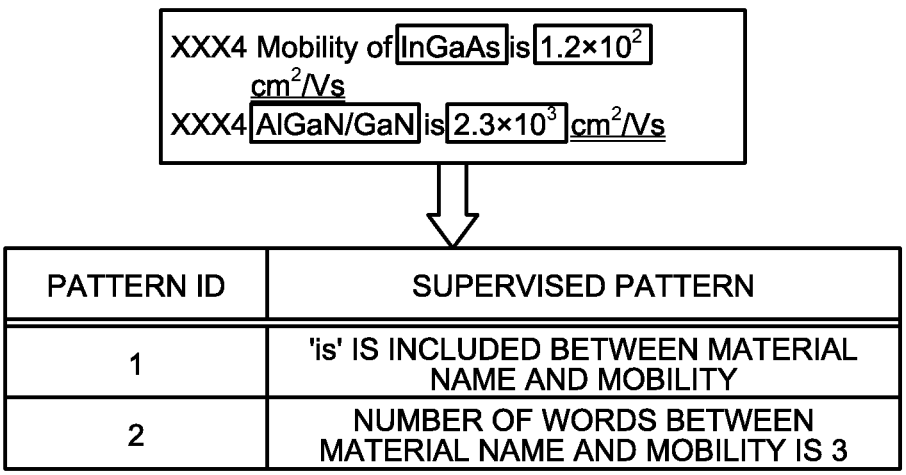
FIG. 6 is a diagram illustrating an example of a weak supervised pattern generated.
FIG. 7 is a diagram illustrating an example of a weak supervised pattern generated.

FIG. 6 and FIG. 7 illustrate diagrams illustrating examples of weak supervised patterns generated by the pattern generator 102 based on the registered training examples. FIG. 6 illustrates generation examples of weak supervised patterns extracting a value indicating the attribute "mobility". Training examples (a1) to (a5) show training examples registered by the example registration screen 500 of FIG. 5, for example. In this example, it is assumed that the character string "cm$^2$/Vs" is described immediately after all training examples and such a character string is registered as a clue expression.

Supervised patterns (b1) to (b8) are weak supervised patterns generating example candidates of the attribute "mobility", which are generated based on the training examples (a1) to (a5). As described above, the character string "cm$^2$/Vs" appearing immediately after a character string is registered as a clue expression. Thus, it is assumed that all weak supervised patterns (b1) to (b8) include the condition "the character string 'cm$^2$/Vs' is described immediately after".

The pattern generator 102 may generate a pattern adaptable only when the same character string as the registered training example appears, such as in the weak supervised patterns (b1) to (b5), and may also generate a weak supervised pattern by a common point in two or more training examples and by generalization of two or more training examples, such as in the weak supervised patterns (b6) to (b8).

For example, the training examples (a1) and (a2) have the common points such as "integral number", "three numbers", and "described as number+00". Thus, the pattern generator 102 generates these as weak supervised patterns.

When weak supervised patterns are generated in such a method, a large amount of weak supervised patterns may be generated. Thus, a limit may be provided as a reference for generating a weak supervised pattern, such as "a pattern the same as the existent pattern is not generated", "a pattern with an output example candidate overlapping the existent pattern with equal to or larger than a given number or ratio is not generated", and "a pattern with the number of output example candidate larger or smaller than a given threshold is not generated". Regarding the generation method or generalization of patterns, any desired existent method such as in Fabio Ciravegna "Adaptive Information Extraction from Text by Rule Induction and Generalisation", Proceedings of IJCAI-2001, for example, may be used.

FIG. 7 illustrates a generation example of a weak supervised pattern extracting the relation between the attribute "material" and the attribute "mobility" as an attribute. The pattern ID is information identifying a generated weak supervised pattern.

In the example of FIG. 7, there is generated, as a weak supervised pattern, information indicating the kind of relation between the attribute "material" and the attribute "mobility" such as a word described between the attributes and the number of words described between the attributes. Similarly to FIG. 6, such information may be generated by a method of generalizing weak supervised patterns such as "a noun is included" and "the number of words between attributes is five or less", a method of finding a common point in a plurality of patterns as a new weak supervised pattern, and the like. Moreover, a weak supervised pattern may be generated that includes a clue expression such as "the character string 'cm$^2$/Vs' appears in the same sentence".

Note that the generation processing of a weak supervised pattern may be performed at any desired timing such as when the operator has explicitly instructed generation, when weak supervised patterns have been registered a given number of times, and when given time has elapsed.

Thereafter, the data generator 103 generates example candidates using the generated weak supervised pattern. FIG. 6 also illustrates output examples of example candidates output by the system (information extraction support device 100) using the weak supervised pattern generated by generalization and examples of determination results by a person (operator) regarding the output examples. For example, FIG. 6 illustrates examples of character strings obtained by applying a weak supervised pattern regarding the attribute "mobility". There can be output "50" as an example to which the weak supervised pattern (b6) is applicable, "9.7" as an example to which the weak supervised pattern (b7) is applicable, "0.5×10$^4$" and "1 was 100" as examples to which the weak supervised pattern (b8) is applicable, and the like. FIG. 6 illustrates the example in which it is determined that "0.5×10$^4$" is correct (O), and "1 was 100" is incorrect.

Note that the example candidates may be generated by any method such as a method of generating only example candidates related to attributes and a method of generating example candidates only when both attributes and the relation between attributes can be generated as example candidates.

Figure 8:
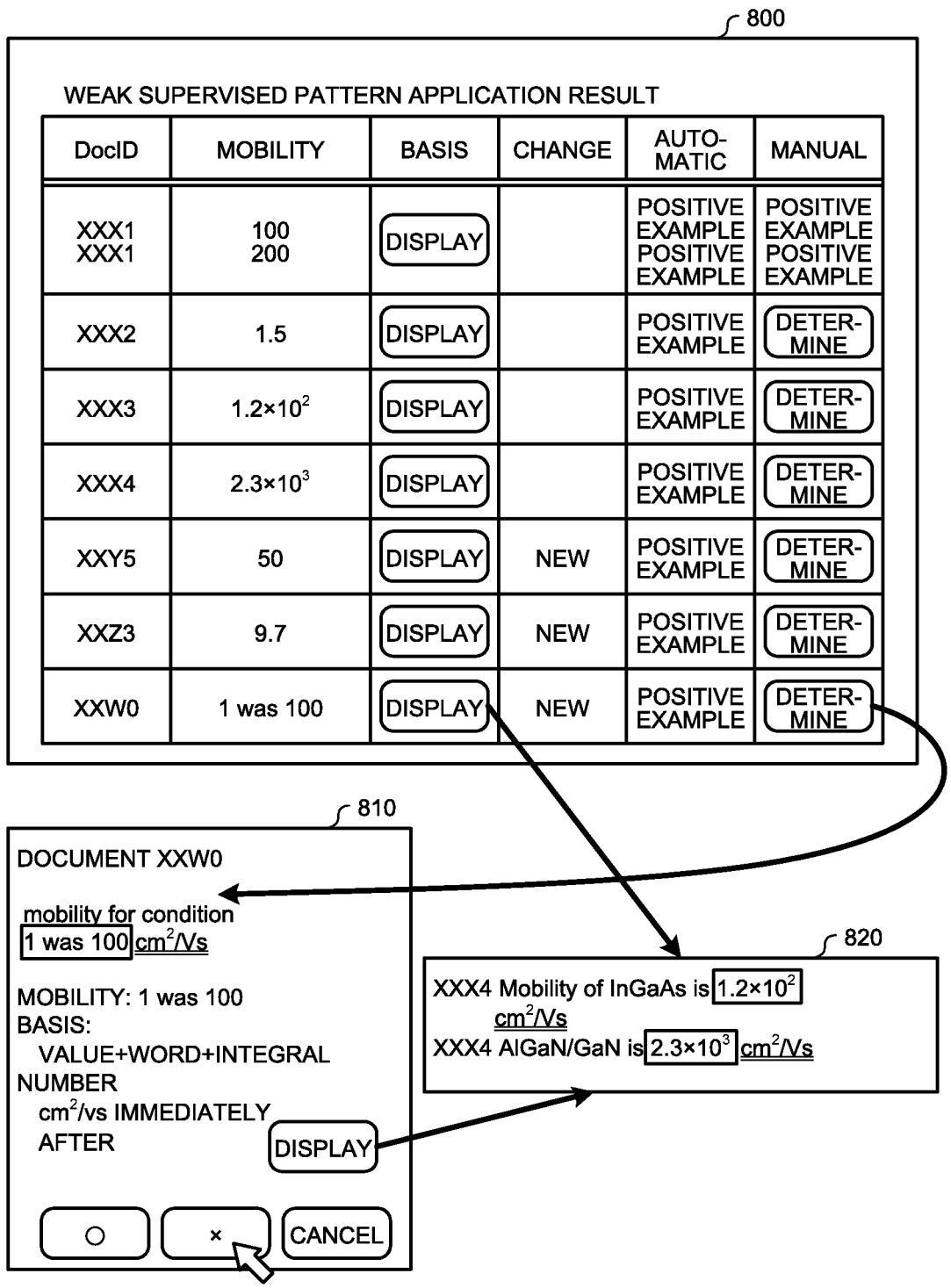
FIG. 8 is a diagram illustrating an example of an output result.

FIG. 8 and FIG. 9 are diagrams illustrating an example of an output result including generated example candidates, added labels, and the like.

FIG. 8 illustrates an example of a list screen 800 showing an application result of the weak supervised pattern related to the attribute "mobility". The output controller 104 displays the list screen 800 including the Doc ID, the mobility, the basis, the change, the determination result (automatic) by the information extraction support device 100, the determination result (manual) by the operator, and the like. In the list screen 800 of FIG. 8, all are results output by the weak supervised pattern. Thus, "positive example" is described in the column "automatic". One part is also training examples registered by the operator. Thus, "positive example" is described also in the column "manual". Regarding newly added example candidates, "new" is described in the column "change".

The operator determines whether these outputs are correct, if necessary. For example, it is possible to determine whether the output "1 was 100" is correct by pressing the "determine" button. A determination screen 810 is an example of a screen displayed when the "determine" button is pressed.

As illustrated in FIG. 8, the output controller 104 displays the determination screen 810 including the example candidate "1 was 100" and the weak supervised pattern as a basis on which the example candidate is generated. The operator presses the "o" button or "x" button of the determination screen 810 to specify a determination result of whether the example candidate is correct. When the cancel button is pressed, the previous screen (list screen 800) is displayed again, for example.

The output controller 104 may display the determination screen 810 including information for specifying that the determination is difficult ("unknown" button, etc.). When this information is specified, the output controller 104 may output, regarding the displayed training example, other training examples with the same or similar clue information. In this manner, it is possible to output information assisting the determination whether the displayed training example is correct.

Once the "display" button is pressed on the list screen 800 or the determination screen 810, a display screen 820 is displayed. The display screen 820 is a screen for showing training examples as bases on which the corresponding weak supervised patterns are generated. The display screen 820 enables the operator to determine whether the training examples are correct and understand and determine what kind of problem exists and what kind of training example should be registered additionally.

FIG. 9 illustrates an application result of a weak supervised pattern also including a pattern related to the relation between the attribute "material" and the attribute "mobility". The weak supervised pattern in this case is, for example, "the 'mobility' appears before the material" (pattern related to a material element), "the 'cm$^2$/Vs' appears after the mobility" (pattern related to a mobility element), "the number of words between the material name and the mobility is 1" (pattern indicating the relation), and the like. The determination method of an output result and the confirmation method of a basis are the same as those in FIG. 8.

Note that a plurality of weak supervised patterns including positive examples and negative examples may be adapted to the same attribute or relation. In such a case, it is possible to determine whether the generated example candidate is a positive example or a negative example in accordance with the majority decision, the degree of importance of weak supervised patterns (weight, priority), or the like. The degree of importance of weak supervised patterns can be determined in accordance with the number of adaptable training examples, the number of correct and incorrect training examples, a ratio between correct and incorrect training examples, and the like. For example, the pattern generator 102 generates a weak supervised pattern with which the determined degree of importance is associated. Then, the data generator 103 changes a weak supervised pattern generating example candidates, in accordance with the degree of importance associated to the weak supervised pattern, for example. The data generator 103 may preferentially apply a supervised pattern with the higher degree of importance to generate example candidates. The data generator 103 may generate a plurality of example candidates using a plurality of adaptable weak supervised patterns, and output a given number of example candidates in the order with higher degree of importance.

Figures 11, 12:
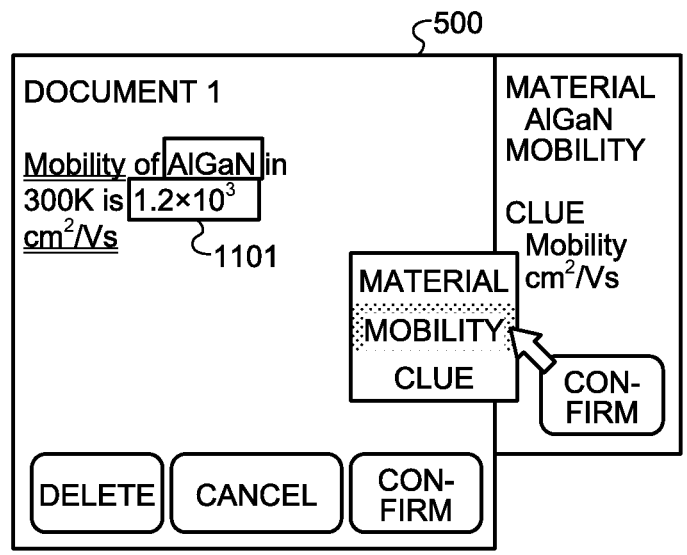
FIG. 11 is a diagram illustrating an example of a screen to correct an error of an output result.
FIG. 12 is a diagram illustrating an example of a determination screen to perform determination only with a value of an example candidate.

FIG. 10 and FIG. 11 are diagrams illustrating examples of a screen for correcting errors of output results. FIG. 10 and FIG. 11 illustrate examples of the case in which example candidates are corrected using the example registration screen 500 the same as that in FIG. 5. Once a delete menu 1001 is specified after a value "300" of the mobility to be corrected is selected in FIG. 10, the value "300" of the mobility is deleted. FIG. 11 illustrates an example of the example registration screen 500 displayed after delete. The operator selects a value 1101 ("1.2×10$^3$") showing the correct mobility, and specifies that this value is the mobility. In this manner, a new training example can be generated.

In the above-described example of FIG. 9, the second determination result (automatic) from the bottom is changed from a positive example to a negative example. This indicates the results of correcting errors in output results in the following manner, for example.

(P1) The data generator 103 applies the weak supervised pattern "the number of words between the material name and the mobility is 1", and generates an example candidate with "300" as the mobility from the sentence "Mobility of InGaZnO on 300 K is 9.7 cm$^2$/Vs".

(P2) On the correction screen such as FIG. 10, it is specified that not "300" but "9.7" indicates the mobility.

(P3) The pattern generator 102 refers to corrected determination result and updates the weak supervised pattern to "negative example when 'K' follows the mobility".

There may be a case in which whether the training example is correct can be determined with reference only to a value of the generated example candidate without confirming in detail the basis or the context such as in the determination screen 810 of FIG. 8. For example, as long as the extraction object is a number such as a characteristic value, it is possible to determine to some extent which is allowed among an integral number, a real number, a negative number, and the like with reference only to the example candidate.

FIG. 12 to FIG. 14 are diagrams illustrating an example of a determination screen to perform determination only with a value of an example candidate. The determination screen may display individual output examples (example candidates), or extract output examples for each weak supervised pattern for display.

FIG. 12 is a simple example in which only values of generated example candidates are displayed. For example, "1 was 100" is not appropriate as a value. Thus, it can be determined "x" regardless of the context. In this case, "1.2 x 102" and "1 was 100" generated by the same weak supervised pattern can be newly distinguished from each other.

FIG. 13 is a diagram illustrating an example in which values are grouped for each weak supervised pattern applied. In this example, it is also possible to determine at the same time all example candidates. Moreover, when the weak supervised pattern is provided with the degree of importance, it is also possible to directly change a value of the degree of importance.

FIG. 14 is an example in which values adaptable to the weak supervised pattern are generated and presented regardless of whether the document includes description. That is, the data generator 103 may generate training examples satisfying the condition defined by the weak supervised pattern, regardless of whether the document includes corresponding description. In this manner, even with a small amount of example candidates adaptable to the weak supervised pattern, for example, it is easier to evaluate whether the weak supervised pattern is correct and whether the weak supervised pattern has versatility. FIG. 14 is an example in which the values are grouped for each weak supervised pattern, similar to FIG. 13. However, a form may be used that individually displays the example candidate, similarly to FIG. 12.

Depending on the weak supervised pattern, the same example candidates satisfying the condition may not be provided. For example, in the weak supervised pattern extracting the relation between attributes, an example candidate with a partially different combination of attributes may be generated. FIG. 15 and FIG. 16 are diagrams illustrating output examples of output results in such a case.

For example, regarding the same material name "GaN", a value of the attribute "mobility" may be changed depending on measurement conditions. FIG. 15 illustrates an example of a screen 1500 outputting example candidates in which a part (mobility) of the combination of attributes is different in such a manner. The operator can specify, with a check box 1501, whether a partially different output result is allowed. Note that "sentence ID" in FIG. 15 is information identifying each sentence in a document. In this manner, the operator may specify whether a partially different output result is allowed in the unit of sentences or may specify in the unit of information other than sentences.

Meanwhile, FIG. 16 illustrates an example of a screen 1600 outputting example candidates generated by the weak supervised pattern extracting the marital relation. For example, regarding countries where the bigamy is not permitted, the partially different combination is not allowed. The operator can specify, with a check box 1601, that a partially different output result is not allowed. In this case, as an evaluation state, there being inconsistency (contradiction) between the registered training example and the output with the partially different combination may be output.

Figure 17:
FIG. 17 is a diagram illustrating an example of a screen allowing registration of synonyms.
Figure 18:
FIG. 18 is a diagram illustrating an example of a screen allowing registration of synonyms.

When the attribute is extracted, absorption of differences in orthographical variants and synonyms may be desirable. FIG. 17 and FIG. 18 illustrate diagrams illustrating examples of a screen in which synonyms can be registered in such cases. FIG. 17 is an example of the case in which orthographical variants cause the state of FIG. 16. There may be provided a function of registering synonyms for the case in which "Barack Obama (Baraku Obama)" and "Barack Obama (Barakku Obama)" are regarded as the same person and the like. For example, the output controller 104 displays a synonym registration screen 1800 illustrated in FIG. 18 when a "synonym registration" menu 1701 is specified. The output controller 104 displays, as synonym candidates, words with edit distance that is a fixed value or less and words having a common word as a related word, on the synonym registration screen 1800. Once the confirmation button 1801 is pressed after an identifiable word is selected, the selected word is registered as a synonym in the storage 121 or the like. The registered synonym is reflected in weak supervised patterns and the later machine learning processing, whereby the contribution to the improvement of extraction performance is expected. It is effective that synonyms are registered also with respect to materials. For example, "In—Ga—Zn—O", "InGaZnO", "IGZO", and "GIZO" may be registered as synonyms.

The combination of the relation extracted from the same sentence may be changed. FIG. 19 is a diagram illustrating an example of the example candidate in such a case. FIG. 19 illustrates the example in which the existent example candidate is the combination of "Company B" and "Company C", which has been changed to the combination of "Company A" and "Company C" as a new example candidate. In FIG. 19, a character string 1901 of "joint" is specified as a positive clue and a weak supervised pattern is generated, and then a character string 1902 of "Against" is specified as a negative clue and a weak supervised pattern is generated. On the screen showing output results such as FIG. 8 and FIG. 9, it is also possible to display the change of combination.

The output controller 104 may further output determination information for the operator to determine whether generated example candidates, generated weak supervised patterns, and clue expressions are sufficient. As the determination information, information may be used that indicates whether conditions are satisfied enough to perform the later machine learning processing. The conditions include a coverage of example candidates relative to the entire document (percentage of document from which example candidates are extracted), the number of weak supervised patterns, the number of clue expressions, the number of positive examples and negative examples of example candidates, and the ratio between positive examples and negative examples, for example.

FIG. 20 is a diagram illustrating a display example of determination information. FIG. 20 is an example displaying a tabulation result of the above-described determination information and the direction of what kind of operation is to be performed next. In this example, the number of negative examples is about ten times the number of positive examples. Thus, it is proposed as the next operation to increase the training examples as positive examples. In this manner, it is also possible to enable the operator to grasp more easily what kind of operation is to be performed next.

The use of example candidates, weak supervised patterns, or clue expressions obtained in the above-described processing, facilitates information extraction based on machine learning, particularly based on supervised learning.

The results obtained by machine learning may be displayed in the same form as FIG. 8, FIG. 9, and the like so that they can be confirmed. FIG. 21 is a diagram illustrating an example of a screen 2100 also displaying scores showing the results learned by machine learning (learning scores).

It is assumed that this example displays, as scores, the probability with which the candidates are regarded to be correct regarding examples that have not been subjected to determination by the operator. For example, a value "24" of the mobility is determined to be "positive example" in the weak supervised pattern. However, the probability of a learning result has a low score of 0.15. When the operator inputs a determination result indicating that the weak supervised pattern is incorrect with respect to the example candidate, the feedback is provided to the weak supervised pattern. When the operator inputs a determination result indicating that the learning result is incorrect, a learning example (training example) is added to the learner 105. Thus, the feedback is provided to the learner 105. In this manner, appropriate feedback is provided to both the weak supervised pattern and the learning equipment (learner 105) of machine learning, which contributes to the improvement.

As described above, in the embodiment, the operator registers training examples and determination bases without describing complicated rules, thereby easily generating weak supervised patterns with high accuracy. With the use of the information extraction support device 100 of the embodiment, it is possible to evaluate and improve information extraction operation continuously and efficiently.

Figure 22:
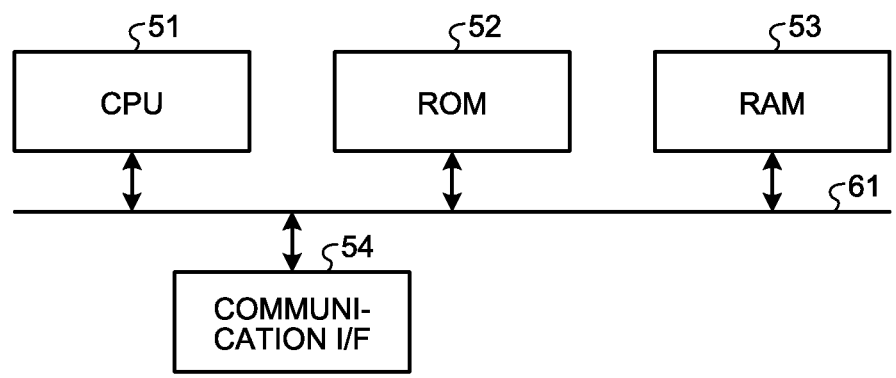
FIG. 22 is a hardware configuration diagram of an information extraction support device.

The following will describe a hardware configuration of the information extraction support device of the embodiment with reference to FIG. 22. FIG. 22 is an explanatory diagram illustrating a hardware configuration example of the information extraction support device according to the embodiment.

The information extraction support device of the embodiment includes a control device such as a central processing unit (CPU) 51, a storage device such as a read only memory (ROM) 52 and a random access memory (RAM) 53, a communication interface (I/F) 54 connected to a network for communication, and a bus 61 connecting the units.

The computer program executed in the information extraction support device of the embodiment is embedded and provided in the ROM 52, for example.

The computer program executed by the information extraction support device according to the embodiment may be recorded and provided as a computer program product in a computer-readable recording medium such as a compact disc read only memory (CD-ROM), a flexible disk (FD), a compact disc recordable (CD-R), and a digital versatile disc (DVD) in an installable or executable file.

Furthermore, the computer program executed by the information extraction support device according to the embodiment may be stored in a computer connected to a network such as the Internet and provided by being downloaded via the network. Furthermore, the computer program executed by the information extraction support device according to the embodiment may be provided or distributed via a network such as the Internet.

The computer program executed by the information extraction support device according to the embodiment can cause a computer to function as the above-described units of the information extraction support device. The computer causes the CPU 51 to read out the computer program from a computer readable storage medium onto a main storage, and execute the computer program.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information extraction support device, comprising: one or more hardware processors configured to:
receive input of a first training example for learning a model used in extraction of one or more pieces of information having a first attribute;
receive clue information indicating a basis for determining that the one or more pieces of information included in the first training example have the first attribute;
generate a supervised pattern for generating a training example including one or more pieces of information that are determined to be the one or more pieces of information having the first attribute using a same basis as the basis indicated by the clue information;
generate a second training example using the supervised pattern; and output the second training example and the clue information that is used to generate the supervised pattern.

2. The information extraction support device according to claim 1, wherein
the one or more hardware processors are further configured to receive input of a determination result indicating whether the second training example is correct, and
the one or more hardware processors are further configured to update the generated supervised pattern based on the determination result.

3. The information extraction support device according to claim 2, wherein the one or more hardware processors are further configured to generate a third training example using the updated supervised pattern, and
the one or more hardware processors are further configured to output a difference between the second training example and the third training example.

4. The information extraction support device according to claim 1, wherein the one or more hardware processors are further configured to receive a keyword used for searching information including the first training example as the clue information.

5. The information extraction support device according to claim 1, wherein
the supervised pattern is a pattern for generating a training example and a determination result indicating whether the training example is correct,
the one or more hardware processors are further configured to generate, using the supervised pattern, the second training example and a determination result of the second training example, and
the one or more hardware processors are further configured to associate the supervised pattern with the determination result of the second training example generated using the supervised pattern and to output the associated result.

6. The information extraction support device according to claim 1, wherein
the supervised pattern defines a condition to be satisfied by a training example used for learning, and
the one or more hardware processors are further configured to generate the second training example satisfying the condition.

7. The information extraction support device according to claim 1, wherein
the one or more hardware processors are further configured to generate the supervised pattern to which a degree of importance is associated, and
the one or more hardware processors are further configured to change the supervised pattern generating the second training example in accordance with the degree of importance.

8. The information extraction support device according to claim 1, wherein
the one or more hardware processors are further configured to learn the model using at least one of the second training example and a training example newly generated using the supervised pattern.

9. The information extraction support device according to claim 1, wherein the one or more hardware processors are further configured to output another training example with the same or similar clue information as the second training example.

10. The information extraction support device according to claim 1, wherein the clue information is selected or input by a user.

11. An information extraction support method, comprising:
receiving input of a first training example for learning a model used in extraction of one or more pieces of information having a first attribute;
receiving clue information indicating a basis for determining that the one or more pieces of information included in the first training example have the first attribute;
generating a supervised pattern for generating a training example including one or more pieces of information that are determined to be the one or more pieces of information having the first attribute using a same basis as the basis indicated by the clue information;
generating a second training example using the supervised pattern; and
outputting the second training example and the clue information that is used to generate the supervised pattern.

12. A computer program product having a non-transitory computer readable medium including programmed instructions, wherein the instructions, when executed by a computer, causing the computer to perform operations comprising:
receiving input of a first training example for learning a model used in extraction of one or more pieces of information having a first attribute
a relation between a plurality of pieces of information;
receiving clue information indicating a basis for determining that the one or more pieces of information included in the first training example have the first attribute;
generating a supervised pattern for generating a training example including one or more pieces of information that are determined to be the one or more pieces of information having the first attribute using a same basis as the basis indicated by the clue information;
generating a second training example using the supervised pattern; and
outputting the second training example and the clue information that is used to generate the supervised pattern.

* * * * *